United States Patent
Chiang et al.

(10) Patent No.: US 9,135,672 B2
(45) Date of Patent: Sep. 15, 2015

(54) DISPLAY SYSTEM AND DATA TRANSMISSION METHOD THEREOF

(71) Applicant: HIMAX TECHNOLOGIES LIMITED, Tainan (TW)

(72) Inventors: Chi-Cheng Chiang, Tainan (TW); Chih-Hsuan Wang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 112 days.

(21) Appl. No.: 13/889,920

(22) Filed: May 8, 2013

(65) Prior Publication Data

US 2014/0333642 A1    Nov. 13, 2014

(51) Int. Cl.
  *G09G 5/36* (2006.01)
  *G06T 1/00* (2006.01)
(52) U.S. Cl.
  CPC .......................................... *G06T 1/00* (2013.01)
(58) Field of Classification Search
  CPC ................ G09G 2340/0435; G09G 2320/103; G09G 2360/18; G09G 2330/022; G09G 2310/04; G09G 5/393
  USPC .......................................................... 345/545
  See application file for complete search history.

(56) References Cited

U.S. PATENT DOCUMENTS

| 5,610,661 | A | 3/1997 | Bhatt |
| 2006/0146056 | A1 | 7/2006 | Wyatt |
| 2011/0249906 | A1 | 10/2011 | Chen et al. |
| 2012/0146968 | A1* | 6/2012 | Glen ............................ 345/204 |
| 2012/0147020 | A1* | 6/2012 | Hussain et al. ............... 345/522 |

FOREIGN PATENT DOCUMENTS

| EP | 2244181 | 10/2010 |
| TW | 200705357 | 2/2007 |
| TW | 200737117 | 10/2007 |
| TW | 200832275 | 8/2008 |
| TW | 201140555 | 11/2011 |

OTHER PUBLICATIONS

"Office Action of Taiwan Counterpart Application," issued on Jan. 22, 2015, p. 1-p. 3.

* cited by examiner

*Primary Examiner* — Hau Nguyen
(74) *Attorney, Agent, or Firm* — J.C. Patents (57) ABSTRACT

A display system and a data transmission method thereof are provided. When a first frame stored in a frame buffer is identical to a second frame to be output from an audio and video (AV) source, the AV source is set an AV control signal corresponding to a self-refresh mode, and a timing controller reads the first frame to output a display data controlled by the AV control signal. When the first frame is differed from the second frame, the AV source is set the AV control signal corresponding to a data update mode and a AV data signal corresponding to the second frame, and the timing controller stores the second frame in the frame buffer controlled by the AV control signal and outputs the display data corresponding to the first frame or the second frame according the timing sequences of the AV data signal and the display data.

22 Claims, 3 Drawing Sheets

DISPLAY SYSTEM AND DATA TRANSMISSION METHOD THEREOF

BACKGROUND

1. Field of the Invention

The present invention is directed to a display system and a data transmission method thereof and more particularly, to a display system having a frame buffer and a data transmission method thereof.

2. Description of Related Art

A display device typically displays images corresponding to frames provided from an audio and video (AV) source. However, under the condition of displaying static images, the display device continuously receives frames transmitted form the AV source and displays the same images. In order to lower down power consumption of the display device receiving the frames while displaying the static images, the display device may be configured with a frame buffer capable of storing an entire frame. Thus, under the condition of displaying dynamic images, the display device displays images corresponding to frames provided from the AV source, while under the condition of displaying static images, the display device may store the static frames in the frame buffer, such that the display device displays images according to the static images stored in the frame buffer.

However, when the AV source provides a new static frame, an operation timing sequence of the display device may not be synchronous with an operation timing sequence of the AV source providing frames. Thus, the action of the display device writing the new static frame into the frame buffer and the action of the display device displaying the static frame stored in the frame buffer may be not successfully linked. As a result, the display device may display a wrong image. Therefore, how to successfully link up writing a new static frame into the frame buffer and reading the old static frame from the frame buffer has become a major matter of the development of such type of display device.

SUMMARY

The present invention is directed to a display system and a data transmission method thereof, in which either a first frame stored in a frame buffer or a second frame transmitted through an audio and video (AV) data signal is determined to be output according to a timing sequence of the AV data signal and the timing sequence of the display data so as to avoid the display device displaying wrong images.

The present invention is directed to a display system including an audio and video (AV) source and a display device. The AV source provides an AV control signal and an AV data signal. The display device includes a frame buffer, a timing controller, a display panel and a driver circuit. The timing controller is coupled to the AV source and the frame buffer to receive the AV control signal and the AV data signal and output display data. The driver circuit is coupled to the timing controller and the display panel to drive the display panel according to the display data. When a first frame stored in the frame buffer is identical to a second frame to be output from the AV source, the AV source sets the AV control signal corresponding to a self-refresh mode, and the timing controller is controlled by the AV control signal to read the first frame stored in the frame buffer to output the display data. When the first frame stored in the frame buffer is different from the second frame to be output from the AV source, the AV source sets AV control signal corresponding to a data update mode and sets the AV data signal according to the second frame, and the timing controller is controlled by the AV control signal to store the second frame in the frame buffer and determine to output the display data corresponding to either the first frame or the second frame according to timing sequence of the AV data signal and timing sequence of the display data.

In an embodiment of the present invention, when a start time of a frame displaying period of a frame period corresponding to the second frame falls within a frame displaying period of a frame period corresponding to the first frame, the timing controller continuously reads the first frame stored in the frame buffer to output the display data.

In an embodiment of the present invention, the timing controller updates a start address of the second frame stored in the frame buffer as one of memory addresses in the frame buffer which does not correspond to the first frame.

In an embodiment of the present invention, the timing controller shortens the frame displaying period of the frame period corresponding to the first frame.

In an embodiment of the present invention, the timing controller shortens a plurality of horizontal blank periods of the frame period corresponding to the first frame.

In an embodiment of the present invention, when a start time of a frame displaying period of a frame period corresponding to the second frame falls within a vertical blank of a frame period corresponding to the first frame, the timing controller outputs the display data corresponding to the second frame.

In an embodiment of the present invention, when the start time of the frame displaying period of the frame period corresponding to the second frame falls within a first period of the vertical blank period of the frame period corresponding to the first frame, the timing controller stores the second frame in the frame buffer and reads the second frame stored in the frame buffer to output the display data.

In an embodiment of the present invention, when an access speed of the frame buffer is less than a sum of a bit rate of the AV data signal and a bit rate of the display data, the timing controller reduces the bit rate of the display data so that the access speed of the frame buffer is greater than or equal to a sum of the bit rate of the AV data signal and the reduced bit rate of the display data.

In an embodiment of the present invention, when the start time of the frame displaying period of the frame period corresponding to the second frame falls within a second period of the vertical blank period of the frame period corresponding to the first frame, the timing controller stores the second frame in the frame buffer and directly outputs the display data corresponding to the second frame. The first period and the second period do not overlap.

In an embodiment of the present invention, when the AV source sets the AV control signal corresponding to the self-refresh mode, the AV source does not set the AV data signal.

The present invention is also directed to a data transmission method of a display system, which includes the following steps. When a first frame stored in a frame buffer is identical to a second frame to be output from an audio and video (AV) source, an AV control signal is set corresponding to a self-refresh mode by the AV source, and a timing controller of a display device is controlled by the AV control signal to read the first frame stored in the frame buffer to output display data. When the first frame stored in the frame buffer is different from the second frame to be output from the AV source, the AV control signal is set corresponding to a data update mode and the AV data signal is set according to the second frame by the AV source, the timing controller is controlled by the AV control signal to store the second frame in the frame buffer, and the display data corresponding to either the first frame or the second frame is determined to output according to timing sequence of the AV data signal and timing sequence of the display data.

In an embodiment of the present invention, the step of determining to output the display data corresponding to either the first frame or the second frame according to the timing sequence of the AV data signal and the timing sequence of the display data includes when a start time of a frame displaying period of a frame period corresponding to the second frame falls within a frame displaying period of a frame period corresponding to the first frame, continuously reading the first frame stored in the frame buffer by the timing controller to output the display data.

In an embodiment of the present invention, the data transmission method of the display system further includes updating a start address of the second frame stored in the frame buffer as one of a plurality of memory addresses in the frame buffer which does not correspond to the first frame by the timing controller.

In an embodiment of the present invention, the data transmission method of the display system further includes shortening the frame displaying period of the frame period corresponding to the first frame by the timing controller.

In an embodiment of the present invention, the step of shortening the frame displaying period of the frame period corresponding to the first frame by the timing controller includes shortening a plurality of horizontal blank periods of the frame period corresponding to the first frame by the timing controller.

In an embodiment of the present invention, the horizontal blank periods are greater than or equal to a minimum time limit thereof.

In an embodiment of the present invention, the step of determining to output the display data corresponding to either the first frame or the second frame according to the timing sequence of the AV data signal and the timing sequence of the display data includes when a start time of a frame displaying period of a frame period corresponding to the second frame falls within a vertical blank of a frame period corresponding to the first frame, outputting the display data corresponding to the second frame by the timing controller.

In an embodiment of the present invention, the step of outputting the display data corresponding to the second frame by the timing controller includes when the start time of the frame displaying period of the frame period corresponding to the second frame falls within a first period of the vertical blank period of the frame period corresponding to the first frame, storing the second frame in the frame buffer and reading the second frame stored in the frame buffer by the timing controller to output the display data.

In an embodiment of the present invention, the data transmission method of the display system further includes when an access speed of the frame buffer is less than a sum of a bit rate of the AV data signal and a bit rate of the display data, reducing the bit rate of the display data by the timing controller so that the access speed of the frame buffer is greater than or equal to a sum of the bit rate of the AV data signal and the reduced bit rate of the display data.

In an embodiment of the present invention, the reduced bit rate of the display data is less than the bit rate of the AV data signal.

In an embodiment of the present invention, the step of outputting the display data corresponding to the second frame by the timing controller includes when the start time of the frame displaying period of the frame period corresponding to the second frame falls within a second period of the vertical blank period of the frame period corresponding to the first frame, storing the second frame in the frame buffer and directly outputting the display data corresponding to the second frame by the timing controller. The first period and the second period do not overlap.

In an embodiment of the present invention, the first period is before the second period, a sum of the first period and the second period is equal to the vertical blank period, and a time length of the first period is equal to the minimum time limit of the vertical blank period.

In an embodiment of the present invention, the data transmission method of the display system further includes when the AV source sets the AV control signal corresponding to the self-refresh mode, not setting the AV data signal by the AV source.

To sum up, in the display system and the data transmission method thereof according to the embodiments of the present invention, when the display device is operated in the data update mode, the timing controller determines to output either the first frame stored in the frame buffer or the second frame transmitted through the AV data signal according to the timing sequence of the AV data signal and the timing sequence of the display data so as to avoid the display device displaying wrong images.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1:
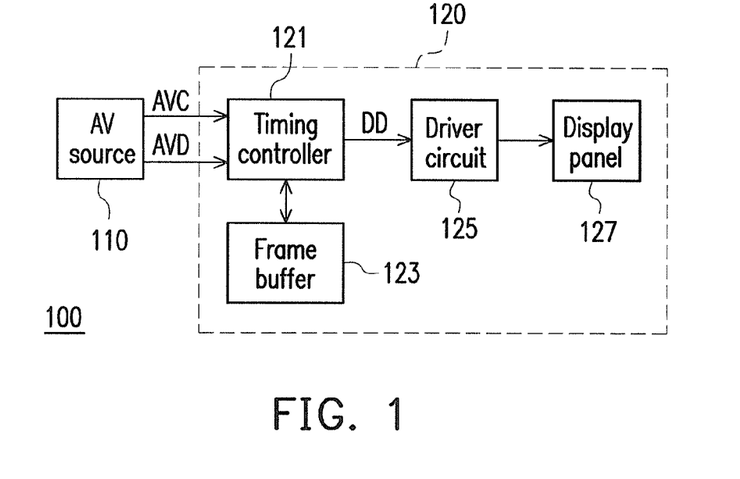
FIG. 1 is a schematic diagram illustrating a display system according to an embodiment of the present invention.

FIG. 1 is a schematic diagram illustrating a display system according to an embodiment of the present invention. Referring to FIG. 1, in the present embodiment, a display system 100 includes an audio and video (AV) source 110 and a display device 120. The AV source 110 may be an AV player or a computer. The display device 120 includes a timing controller 121, a frame buffer 123, a driver circuit 125 and a display panel 127.

The AV source 110 provides an AV control signal AVC and an AV data signal AVD. The timing controller 121 is coupled to the AV source 110 and a frame buffer 123 to receive the AV control signal AVC and the AV data signal AVD and output display data DD. The driver circuit 125 is coupled to the timing controller 121 and the display panel 127 to drive the display panel 127 according to the display data DD.

In the present embodiment, when a frame provided from the AV source 110 is a dynamic frame, that is, every frame transmitted through the AV data signal AVD is different, the AV source 110 sets the AV control signal AVC corresponding to a standard mode. In the meantime, the timing controller 121 controls the display device 120 to be operated in the standard mode according to the AV control signal AVC and outputs the display data DD according to the frame transmitted through the AV data signal AVD.

When a frame provided from the AV source 110 is a static frame, that is, every frame transmitted through the AV data signal AVD is the same, the AV source 110 sets the AV control signal AVC corresponding to the self-refresh mode. In the meantime, the timing controller 121 controls the display device 120 to be operated in the self-refresh mode according to the AV control signal AVC. Besides, the timing controller 121 stores the first of a plurality of static frames (corresponding to a first frame) in the frame buffer 123 and outputs the display data DD corresponding to the first static frame.

Then, when a frame to be output from the AV source 110 (corresponding to a second frame) is identical to the static frame stored in the frame buffer 123, the AV control signal AVC keeps corresponding to the self-refresh mode so that the timing controller 121 continuously reads the static frame stored in the frame buffer 123 to output the display data DD. The AV source 110 may store a frame corresponding to the static frame stored in the frame buffer 123 for comparison, and the AV source 110 does set the AV data signal AVD according to the frame to be output. Namely, the AV data signal AVD is in an idle state.

On the other hand, when the frame to be output from the AV source 110 (corresponding to the second frame) is a static frame and different form the static frame that is already stored in the frame buffer 123, the AV source 110 sets the AV control signal AVC corresponding to a data update mode and sets the AV data signal AVD according to the frame to be output. At this time, the timing controller 121 controls the display device 120 to be operated in the data update mode according to the AV control signal AVC. Meanwhile, since when being operated in the self-refresh mode, the display device 120 may not operate synchronously with the AV source 110, a timing sequence of the AV data signal AVD may be different from a timing sequence of the timing controller 121 outputting the display data DD.

When the display device 120 is operated in the data update mode, the timing controller 121 determines to output the display data DD corresponding to either the static frame stored in the frame buffer 123 or the frame transmitted through the AV data signal AVD according to the timing sequence of the AV data signal AVD and a timing sequence of the display data DD so as to avoid the display panel 127 displaying a wrong image. In the meantime, when an access speed of the frame buffer 123 is not sufficient for writing and reading at the same time, the timing controller 121 may adjust the way to write data into and/or read data from the frame buffer 123 so that the frame transmitted through the AV data signal AVD may be successfully written into the frame buffer 123 and the static frame stored in the frame buffer 123 may be successfully read.

Figure 2:
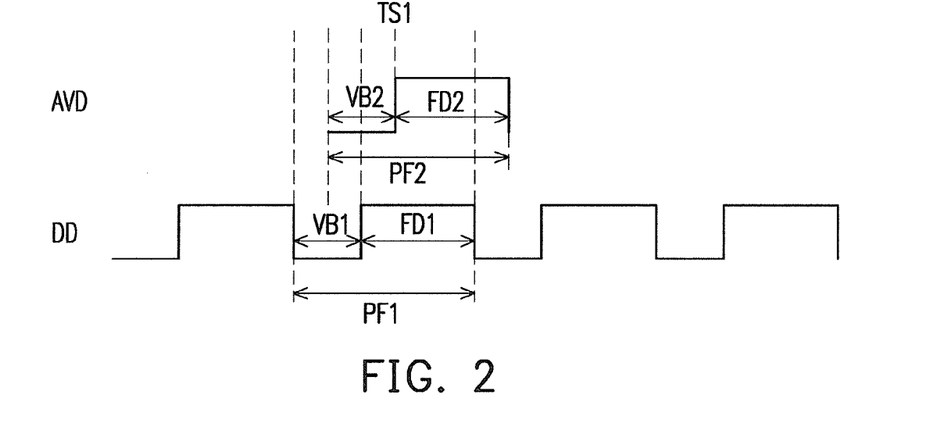
FIG. 2 is a schematic diagram illustrating a timing sequence of data transmission of the display system according to an embodiment of the present invention.

FIG. 2 is a schematic diagram illustrating a timing sequence of data transmission of the display system according to an embodiment of the present invention. Referring to FIG. 2 with FIG. 1, in the present embodiment, when the display device 120 is operated in the self-refresh mode, the timing controller 121 continuously read the static frame stored in the frame buffer 123 to output the display data DD so that a plurality of frame periods (for example, PF1) is formed by the timing sequence of the display data DD, i.e. a frame period corresponding to the static frame stored in the frame buffer 123. Here, it is assumed that a static frame to be output from the AV source 110 is different from the static frame that is already stored in the frame buffer 123, the AV control signal AVC is set corresponding to the data update mode, and the AV data signal AVD is set corresponding to the static frame to be output from the AV source 110 so that a frame period (for example, PF2) is formed by the timing sequence of the AV data signal AVD, i.e. a frame period corresponding to the static frame transmitted through the AV data signal AVD.

In the present embodiment, each frame period (e.g. PF1 or PF2) includes a vertical blank period (e.g. VB1 or VB2) and a frame displaying period (e.g. FD1 or FD2), and a start time TS1 of the frame displaying period FD2 of the frame period PF2 falls with in the frame displaying period FD1 of the frame period PF1. At this time, the display data DD corresponding to the static frame stored in the frame buffer 123 starts to be transmitted to the driver circuit 125. Thus, the timing controller 121 continuously reads the static frame stored in the frame buffer 123 to maintain the competence of the display data DD so as to avoid the display panel 127 displaying a wrong image. In the meantime, the timing controller 121 stores the static frame transmitted through the AV data signal AVD in a memory space in the frame buffer 123, which is already read or unused.

In other words, when the start time TS1 of the frame displaying period FD2 of the frame period PF2 of the AV data signal AV falls within the frame displaying period FD1 of the frame period PF1 of the display data DD, the timing controller 121 writes the static frame transmitted through the AV data signal AVD into the frame buffer 123 and continuously reads the static frame that is previously stored in the frame buffer 123 to output the display data DD.

When an access speed of the frame buffer 123 is greater than or equal to a sum of the bit rate of the AV data signal AVD and a bit rate of the display data DD, the frame buffer 123 may successfully perform the operations as described above. However, when the access speed of the frame buffer 123 is less than the sum of the bit rate of the AV data signal AVD and the bit rate of the display data DD, an unexpected error may occur if the frame buffer 123 performs the above-described operations. At this time, the timing controller 121 may reduce the bit rate of the display data DD so that the access speed of the frame buffer 123 is greater than or equal to a sum of the bit rate of the AV data signal AVD and the reduced bit rate of the display data DD. The reduced bit rate of the display data DD is less than the bit rate of the AV data signal AVD.

For example, it is assumed that an operation frequency of the frame buffer 123 is up to 200 M Hz, a single data width is 32 bits, the frame buffer 123 has read and write capability (or data bandwidth) of 6.4 G bps. If the display device 120 has a frame rate of 60 Hz, Full HD quality (of which the resolution is 1920×1080) and a data size of display data DD in of a single pixel of 24 bits, the AV data signal AVD and the bit rate of the display data DD are respectively 3.6 G bps (corresponding to an operation frequency of 150 M Hz). Accordingly, a sum of the AV data signal AVD and the bit rate of the display data DD is 7.2 G bps, which exceeds the read and write capability of the frame buffer 123. After reducing the operation frequency of the display data DD from 150 M Hz to 100 M Hz (that is, the reduced bit rate of the display data DD is 2.4 G bps), a sum of the bit rate of the AV data signal AVD and the reduced bit rate of the display data DD is 6 G bps, and thus, the frame buffer 123 may successfully perform reading and writing the frame.

Figure 3:
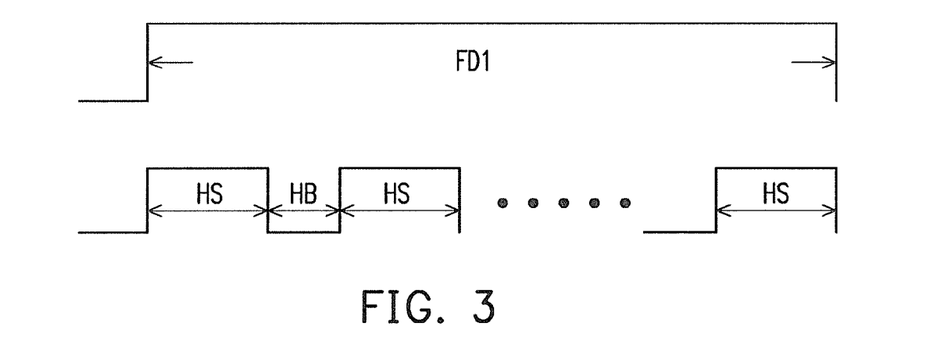
FIG. 3 is a schematic diagram illustrating a timing sequence of a single frame period according to an embodiment of the present invention.

FIG. 3 is a schematic diagram illustrating a timing sequence of a single frame period according to an embodiment of the present invention. Referring to FIG. 1 through FIG. 3, due to the reduced bit rate of the display data DD of the preceding embodiment, the frame buffer 123 may successfully perform reading and writing the frame; however, a write speed of the frame buffer 123 is greater than its read speed. When the start time TS1 of the frame displaying period FD2 of the frame period PF2 approaches a end time of the frame displaying period FD1 of the frame period PF1, reading the static frame stored in the frame buffer 123 ends before completely writing the static frame transmitted through the AV data signal AVD into the frame buffer 123. As such, the complete image may be displayed on the display panel 127.

However, when the start time TS1 of the frame displaying period FD2 of the frame period PF2 approaches the start time of the frame displaying period FD1 of the frame period PF1, the frame buffer 123 may possibly cover a part of the static frame stored in the frame buffer 123 that is not yet read during the frame displaying period FD1 with the static frame transmitted through the AV data signal AVD. As result, the display panel 127 may display a wrong image.

In the present embodiment, the timing controller 121 solves the aforementioned problem by shortening the frame displaying period FD1 of the frame period PF1. After the frame displaying period FD1 is shortened, the time for the timing controller 121 to output the display data DD corresponding to the static frame stored in the frame buffer 123 is synchronously decreased, and relatively, the speed of reading the static frame stored in the frame buffer 123 is increased so as to avoid the part of the static frame stored in the frame buffer 123 that is not yet read during the frame displaying period FD1 being covered by the static frame transmitted through the AV data signal AVD.

Furthermore, the frame displaying period FD1 corresponds to a plurality of horizontal blank periods HS and a plurality of horizontal blank periods HB. Therein, the timing controller 121 does not output the display data in the horizontal blank periods HB, and namely, the timing controller 121 temporarily stop reading the frame buffer 123. Thus, the frame displaying period FD1 may be shortened by shortening the horizontal blank periods HB without influencing the output of the display data DD. Meanwhile, the horizontal blank periods HB are greater than or equal to a minimum time limit thereof so as to avoid the driver circuit 125 being incapable of correctly driving the display panel 127.

Figure 4:
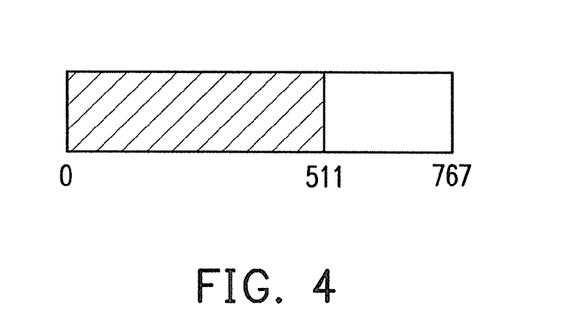
FIG. 4 is a schematic diagram illustrating a memory space configuration of a frame buffer according to an embodiment of the present invention.

FIG. 4 is a schematic diagram illustrating a memory space configuration of a frame buffer according to an embodiment of the present invention. Referring to FIG. 4 with FIG. 1 and FIG. 2, where the problem to be solved is the same as that set forth in the embodiment of the FIG. 3, another solution to the problem is provided in the present embodiment. In the present embodiment, it is assumed that addresses used by the static frame is addresses 0-511 (i.e. a start address of the static frame is 0) in the frame buffer 123, while the memory spaces of addresses 512-767 in the frame buffer 123 are idle. Since the frame buffer 123 has idle memory spaces (e.g. the addresses 512-767), the static frame transmitted through the AV data signal AVD may be firstly written into the aforementioned idle memory spaces, that is, the start address for reading and writing in the frame buffer 123 is updated as one of the addresses corresponding to the memory spaces in the frame buffer 123 that are not used by the static frame. For example, the start address of reading and writing in the frame buffer 123 is updated as the address 512.

In the present embodiment, when the frame buffer 123 has more idle memory spaces, the possibility that the part of the static frame stored in the frame buffer 123 that is not yet read during the frame displaying period FD1 is covered becomes less. Meanwhile, when the idle memory spaces in the frame buffer 123 are greater than or equal to memory spaces for storing a frame and a start address of reading and writing is adaptively set, the unread part of the static frame stored in the frame buffer 123 is not covered during the frame displaying period FD1.

Based on the above described embodiments, under a condition of the frame buffer 123 having limited spaces, how to select a lowest operation frequency satisfying the operation frequency of the frame buffer 123 (i.e. the operation frequency of the display data DD) may approximately obtained by the following formulas.

$$\text{bit\_rate} = \text{h\_total} \cdot \text{v\_total} \cdot \text{bit\_per\_pixel} \cdot \text{frame\_rate} \quad (1)$$

$$\text{frame\_active\_size} = \text{h\_size} \cdot \text{v\_size} \cdot \text{bit\_per\_pixel} \quad (2)$$

$$\text{bit\_rate} \cdot \frac{\text{clk\_o}}{\text{clk\_i}} \cdot \frac{\text{h\_size}}{\text{h\_size} + \text{h\_blanking\_o}} \cdot t = \quad (3)$$
$$\text{bit\_rate} \cdot \frac{\text{h\_size}}{\text{h\_size} + \text{h\_blanking\_i}} \cdot t -$$
$$(\text{frame\_buffer\_size} - \text{frame\_active\_size})$$

$$t \geq \frac{\text{v\_size}}{\text{v\_total}} \cdot \frac{1}{\text{frame\_rate}} \quad (4)$$

Therein, bit_rate represents a bit rate, h_total represents a horizontal width of a frame, v_total represents a vertical length of the frame, bit_per_pixel represents a data size corresponding a pixel, frame_rate is a frame rate, frame_active_size represents a size of an active area (corresponding to a frame displaying period) in the frame, h_size represents a horizontal width of the active area, v_size represents a vertical length of the active area, h_blanking_i represents a size of a vertical blank period of the AV data signal AVD, clk_i represents an operation frequency of the AV data signal AVD, h_blanking_o is a size of a vertical blank period of the display data DD, clk_o represents an operation frequency of the display data DD, frame_buffer_size represents a capacity size of the frame buffer 123, and t represents a time length required for outputting the active area. By the aforementioned formulas, an operation frequency approximate to the minimum acceptable operation frequency of the display data DD may be derived. Therein, h_blanking_o in formula (3) may correspond to the shortened horizontal blank periods HB in the embodiment of FIG. 3.

Figure 5:
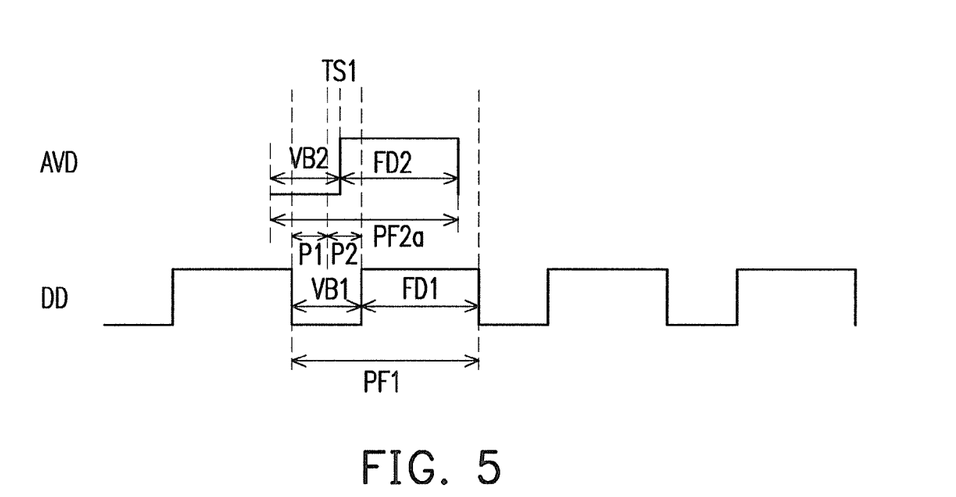
FIG. 5 is a schematic diagram illustrating a timing sequence of data transmission of the display system according to an embodiment of the present invention.

FIG. 5 is a schematic diagram illustrating a timing sequence of data transmission of the display system according to an embodiment of the present invention. With reference to FIG. 5 with FIG. 1 and FIG. 2, identical or similar reference numerals are used for the same or similar parts in those figures. In the present embodiment, the vertical blank period VB1 of the frame period PF1 is divided into a first period P1 and a second period P2. The first period P1 is before the second period P2, a sum of the first period P1 and the second period P2 is equal to the vertical blank period VB1, and a time length of the first period P1 is equal to a minimum time limit of the vertical blank period VB1.

In the present embodiment, the start time TS1 of the frame displaying period FD2 of the frame period PF2 a falls within the second period P2 of the vertical blank period VB1. At this time, the driver circuit 125 is ready for receiving the display data DD. Namely, the display data DD corresponding to the static frame transmitted through the AV data signal AVD is about to be transmitted to the driver circuit 125 so that the driver circuit 125 may drive the display panel 127 according to the received display data DD. Thus, the timing controller 121 may directly transmit the display data DD corresponding to the static frame transmitted through the AV data signal AVD to the driver circuit 125 and stores the static frame transmitted through the AV data signal AVD in the frame buffer 123.

Figure 6:
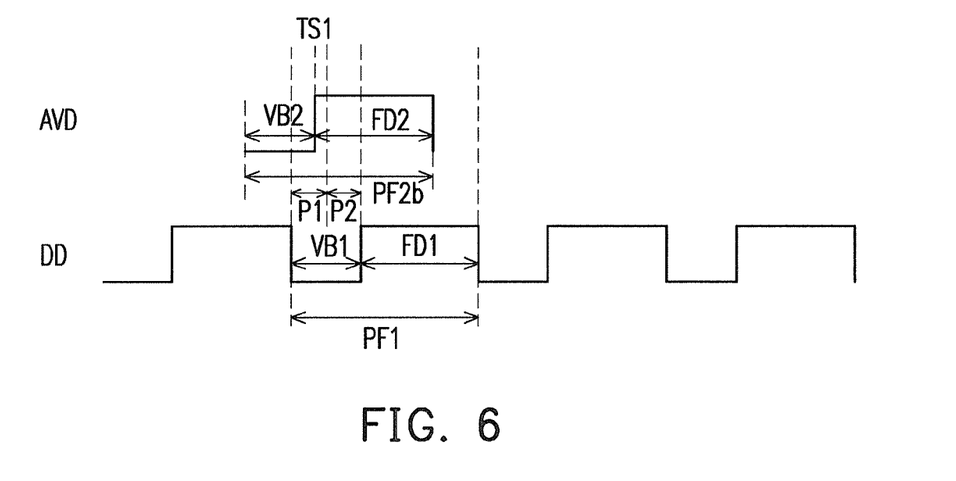
FIG. 6 is a schematic diagram illustrating a timing sequence of data transmission of the display system according to an embodiment of the present invention.

FIG. 6 is a schematic diagram illustrating a timing sequence of data transmission of the display system according to an embodiment of the present invention. Referring to FIG. 6 with FIG. 1, FIG. 2 and FIG. 5, identical or similar reference numerals are used for the same or similar parts in those figures. In the present embodiment, the start time TS1 of the frame displaying period FD2 of the frame period PF2b falls within the first period P1 of the vertical blank period VB1. At this time, the driver circuit 125 is not ready for receiving the display data DD. Namely, directly transmitting the display data DD corresponding to the static frame transmitted through the AV data signal AVD to the driver circuit 125 may cause the driver circuit 125 to be incapable of correctly driving the display panel 127. Thus, the timing controller 121 may store the static frame transmitted through the AV data signal AVD in the frame buffer 123 and then, read a new static frame from the frame buffer 123 to output the display data DD.

Additionally, when the access speed of the frame buffer 123 is less than the sum of the bit rate of the AV data signal AVD and the bit rate of the display data DD, the bit rate of the display data DD with reference to the embodiment of FIG. 2 so that the speed of the frame buffer 123 is greater than or equal to the sum of the bit rate of the AV data signal AVD and the reduced bit rate of the display data DD. Since the timing controller 121 reads the new static frame from the frame buffer 123, the problem of covering the part of the frame that is not yet read will not happen.

According to the embodiments of the FIG. 5 and FIG. 6, when the start time TS1 of the frame displaying period FD2 of the frame period (for example, PF2a or PF2b) of the AV data signal AVD falls within the vertical blank period VB1, the timing controller 121 outputs the display data DD corresponding to the static frame transmitted through the AV data signal AVD.

Figure 7:
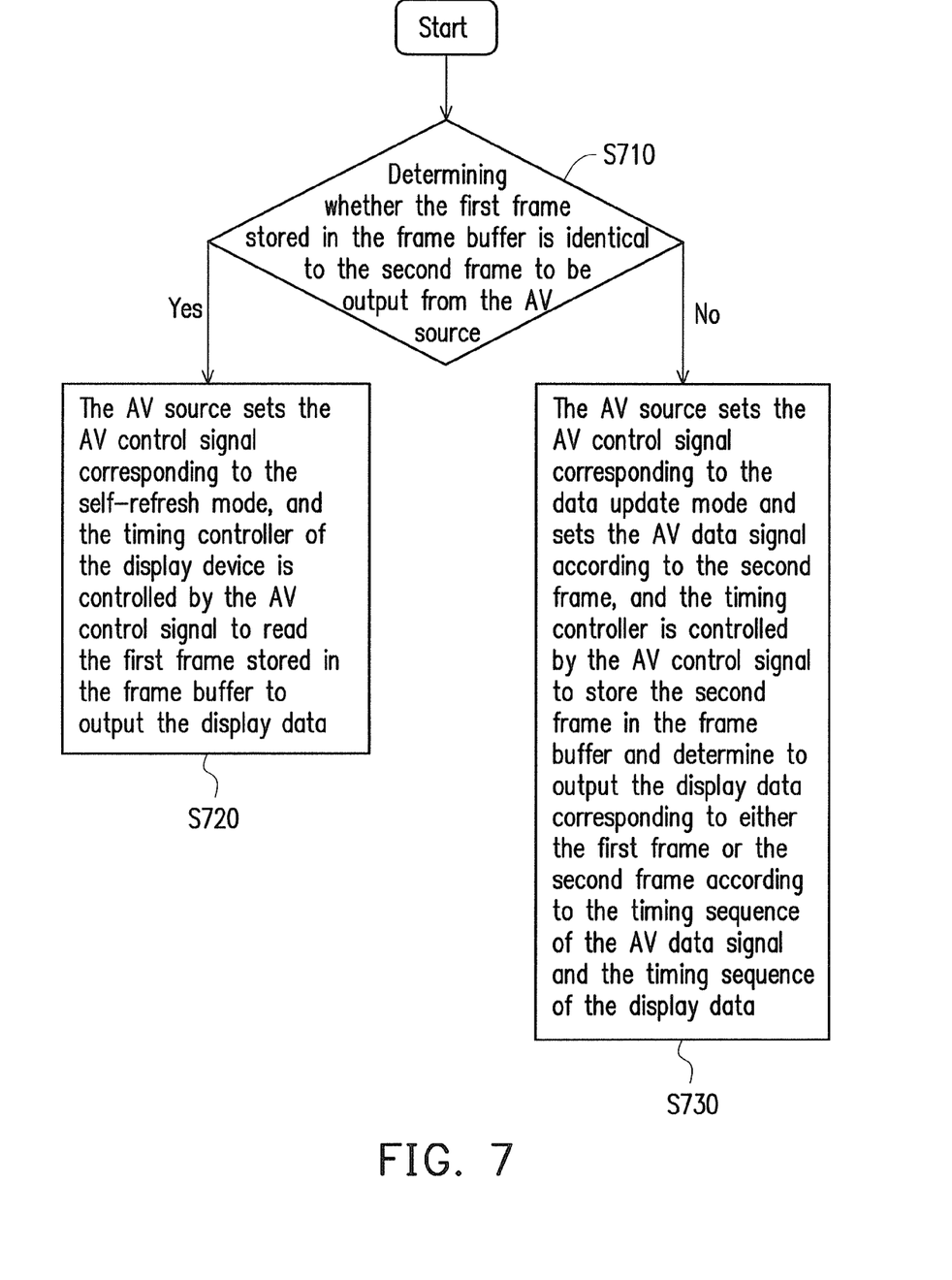
FIG. 7 is a flowchart illustrating a data transmission method of the display system according to an embodiment of the present invention.

FIG. 7 is a flowchart illustrating a data transmission method of the display system according to an embodiment of the present invention. With reference to FIG. 7, in the present embodiment, whether the first frame stored in the frame buffer is identical to the second frame to be output from the AV source is determined (step S710). When the first frame stored in the frame buffer is identical to the second frame to be output from the AV source, i.e. the determination result of step S710 is "Yes", step S720 is performed. In step S720, the AV source sets the AV control signal corresponding to the self-refresh mode, and the timing controller of the display device is controlled by the AV control signal to read the first frame stored in the frame buffer to output the display data. Otherwise, when the first frame stored in the frame buffer is different from the second frame to be output from the AV source, i.e. the determination result of step S710 is "No", step S730 is performed. In step S730, the AV source sets the AV control signal corresponding to the data update mode and sets the AV data signal according to the second frame. And, the timing controller is controlled by the AV control signal to store the second frame in the frame buffer and determine to output the display data corresponding to either the first frame or the second frame according to the timing sequence of the AV data signal and the timing sequence of the display data. The details of the aforementioned steps may refer to the embodiments of FIG. 1 through FIG. 6, which will not be repeated.

Based on the above, the display system and the data transmission method thereof according to the embodiments of the present invention, when the display device is operated in the data update mode, the timing controller determines to output either the first frame stored in the frame buffer or the second frame transmitted through the AV data signal according to the timing sequence of the AV data signal and the timing sequence of the display data so as to avoid the display device displaying wrong images. Besides, under the condition where the frame buffer is insufficient for reading and writing at the same time, timing controller is reducing the bit rate of the display data and shortening the frame displaying period or setting the start address of a new static frame as corresponding to an idle memory space so as to avoid the to-be-read part of the frame being covered.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A display system, comprising:
an audio and video (AV) source, providing an AV control signal and an AV data signal;
a display device, comprising:
a frame buffer;
a timing controller, coupled to the AV source and the frame buffer to receive the AV control signal and the AV data signal and output display data;
a display panel; and
a driver circuit, coupled to the timing controller and the display panel to drive the display panel according to the display data,
wherein when a first frame stored in the frame buffer is identical to a second frame to be output from the AV source, the AV source sets the AV control signal corresponding to a self-refresh mode, and the timing controller is controlled by the AV control signal to read the first frame stored in the frame buffer to output the display data,
when the first frame stored in the frame buffer is different from the second frame to be output from the AV source, the AV source sets AV control signal corresponding to a data update mode and sets the AV data signal according to the second frame, and the timing controller is controlled by the AV control signal to store the second frame in the frame buffer and determine to output the display data corresponding to either the first frame or the second frame according to a timing sequence of the AV data signal and a timing sequence of the display data,
wherein when a start time of a frame displaying period of a frame period corresponding to the second frame falls within a frame displaying period of a frame period corresponding to the first frame, the timing controller continuously reads the first frame stored in the frame buffer to output the display data, wherein when an access speed of the frame buffer is less than a sum of a bit rate of the AV data signal and a bit rate of the display data, the timing controller reduces the bit rate of the display data so as to enable the access speed of the frame buffer to be greater than a sum of the bit rate of the AV data signal and the reduced bit rate of the display data.

2. The display system according to claim 1, wherein the reduced bit rate of the display data is less than the bit rate of the AV data signal.

3. The display system according to claim 1, wherein the timing controller updates a start address of the second frame stored in the frame buffer as one of a plurality of memory addresses in the frame buffer which does not correspond to the first frame.

4. The display system according to claim 1, wherein the timing controller shortens the frame displaying period of the frame period corresponding to the first frame.

5. The display system according to claim 4, wherein the timing controller shortens a plurality of horizontal blank periods of the frame period corresponding to the first frame.

6. The display system according to claim 5, wherein the plurality of horizontal blank periods is greater than or equal to a minimum time limit thereof.

7. The display system according to claim 1, wherein when the AV source sets the AV control signal corresponding to the self-refresh mode, the AV source does not set the AV data signal.

8. A data transmission method of a display system, comprising:

when a first frame stored in a frame buffer is identical to a second frame to be output from an audio and video (AV) source, setting an AV control signal corresponding to a self-refresh mode by the AV source, controlling a timing controller of a display device by the AV control signal to read the first frame stored in the frame buffer to output display data;

when the first frame stored in the frame buffer is different from the second frame to be output from the AV source, setting the AV control signal corresponding to a data update mode and setting the AV data signal according to the second frame by the AV source, controlling the timing controller by the AV control signal to store the second frame in the frame buffer and determining to output the display data corresponding to either the first frame or the second frame according to a timing sequence of the AV data signal and a timing sequence of the display data, wherein the step of determining to output the display data corresponding to either the first frame or the second frame according to the timing sequence of the AV data signal and the timing sequence of the display data comprises:

when a start time of a frame displaying period of a frame period corresponding to the second frame falls within a frame displaying period of a frame period corresponding to the first frame, continuously reading the first frame stored in the frame buffer by the timing controller to output the display data; and when an access speed of the frame buffer is less than a sum of a bit rate of the AV data signal and a bit rate of the display data, reducing the bit rate of the display data by the timing controller so as to enable the access speed of the frame buffer to be greater than a sum of the bit rate of the AV data signal and the reduced bit rate of the display data.

9. The data transmission method of the display system according to claim 8, wherein the reduced bit rate of the display data is less than the bit rate of the AV data signal.

10. The data transmission method of the display system according to claim 8, further comprising:

updating a start address of the second frame stored in the frame buffer as one of a plurality of memory addresses in the frame buffer which does not correspond to the first frame by the timing controller.

11. The data transmission method of the display system according to claim 8, further comprising:

shortening the frame displaying period of the frame period corresponding to the first frame by the timing controller.

12. The data transmission method of the display system according to claim 11, wherein the step of shortening the frame displaying period of the frame period corresponding to the first frame by the timing controller comprises:

shortening a plurality of horizontal blank periods of the frame period corresponding to the first frame by the timing controller.

13. The data transmission method of the display system according to claim 12, wherein the plurality of horizontal blank periods is greater than or equal to a minimum time limit thereof.

14. The data transmission method of the display system according to claim 8, further comprising:

when the AV source sets the AV control signal corresponding to the self-refresh mode, not setting the AV data signal by the AV source.

15. A display system, comprising:

an audio and video (AV) source, providing an AV control signal and an AV data signal;

a display device, comprising:

a frame buffer;

a timing controller, coupled to the AV source and the frame buffer to receive the AV control signal and the AV data signal and output display data;

a display panel; and a driver circuit, coupled to the timing controller and the display panel to drive the display panel according to the display data, wherein when a first frame stored in the frame buffer is identical to a second frame to be output from the AV source, the AV source sets the AV control signal corresponding to a self-refresh mode, and the timing controller is controlled by the AV control signal to read the first frame stored in the frame buffer to output the display data, when the first frame stored in the frame buffer is different from the second frame to be output from the AV source, the AV source sets AV control signal corresponding to a data update mode and sets the AV data signal according to the second frame, and the timing controller is controlled by the AV control signal to store the second frame in the frame buffer and determine to output the display data corresponding to either the first frame or the second frame according to a timing sequence of the AV data signal and a timing sequence of the display data, wherein when a start time of a frame displaying period of a frame period corresponding to the second frame falls within a vertical blank of a frame period corresponding to the first frame, the timing controller outputs the display data corresponding to the second frame, wherein when the start time of the frame displaying period of the frame period corresponding to the second frame falls within a first period of the vertical blank period of the frame period corresponding to the first frame, the timing controller stores the second frame in the frame buffer and reads the second frame stored in the frame buffer to output the display data, wherein when an access speed of the frame buffer is less than a sum of a bit rate of the AV data signal and a bit rate of the display data, the timing controller reduces the bit rate of the display data so as to enable the access speed of the frame buffer to be greater than or equal to a sum of the bit rate of the AV data signal and the reduced bit rate of the display data.

16. The display system according to claim 15, wherein the reduced bit rate of the display data is less than the bit rate of the AV data signal.

17. The display system according to claim 15, wherein when the start time of the frame displaying period of the frame period corresponding to the second frame falls within a second period of the vertical blank period of the frame period corresponding to the first frame, the timing controller stores the second frame in the frame buffer and directly outputs the display data corresponding to the second frame, wherein the first period and the second period do not overlap.

18. The display system according to claim 17, wherein the first period is before the second period, a sum of the first period and the second period is equal to the vertical blank period, and a time length of the first period is equal to the minimum time limit of the vertical blank period.

19. A data transmission method of a display system, comprising:
when a first frame stored in a frame buffer is identical to a second frame to be output from an audio and video (AV) source, setting an AV control signal corresponding to a self-refresh mode by the AV source, controlling a timing controller of a display device by the AV control signal to read the first frame stored in the frame buffer to output display data;
when the first frame stored in the frame buffer is different from the second frame to be output from the AV source, setting the AV control signal corresponding to a data update mode and setting the AV data signal according to the second frame by the AV source, controlling the timing controller by the AV control signal to store the second frame in the frame buffer and determining to output the display data corresponding to either the first frame or the second frame according to a timing sequence of the AV data signal and a timing sequence of the display data, wherein the step of determining to output the display data corresponding to either the first frame or the second frame according to the timing sequence of the AV data signal and the timing sequence of the display data comprises:
when a start time of a frame displaying period of a frame period corresponding to the second frame falls within a vertical blank of a frame period corresponding to the first frame, outputting the display data corresponding to the second frame by the timing controller, wherein the step of outputting the display data corresponding to the second frame by the timing controller comprises:
when the start time of the frame displaying period of the frame period corresponding to the second frame falls within a first period of the vertical blank period of the frame period corresponding to the first frame, storing the second frame in the frame buffer and reading the second frame stored in the frame buffer by the timing controller to output the display data,
when an access speed of the frame buffer is less than a sum of a bit rate of the AV data signal and a bit rate of the display data, reducing the bit rate of the display data by the timing controller so as to enable the access speed of the frame buffer to be greater than or equal to a sum of the bit rate of the AV data signal and the reduced bit rate of the display data.

20. The data transmission method of the display system according to claim 19, wherein the reduced bit rate of the display data is less than the bit rate of the AV data signal.

21. The data transmission method of the display system according to claim 19, the step of outputting the display data corresponding to the second frame by the timing controller comprises:
when the start time of the frame displaying period of the frame period corresponding to the second frame falls within a second period of the vertical blank period of the frame period corresponding to the first frame, storing the second frame in the frame buffer and directly outputting the display data corresponding to the second frame by the timing controller, wherein the first period and the second period do not overlap.

22. The data transmission method of the display system according to claim 21, wherein the first period is before the second period, a sum of the first period and the second period is equal to the vertical blank period, and a time length of the first period is equal to the minimum time limit of the vertical blank period.

* * * * *